United States Patent [19]

Neyer

[11] 3,868,865
[45] Mar. 4, 1975

[54] PUSH PULL CONTROL FOR LAWN MOWERS AND THE LIKE

[75] Inventor: James U. Neyer, Lake Bluff, Ill.

[73] Assignee: Arens Controls, Inc., Evanston, Ill.

[22] Filed: Aug. 29, 1973

[21] Appl. No.: 392,429

[52] U.S. Cl............................. 74/501 R, 74/501 P
[51] Int. Cl. ............................................. F16c 1/10
[58] Field of Search.......... 74/501 R, 503, 523, 469, 74/519, 566, 501 P; 308/15, 22; 56/11.7, 11.8, 17.5; 137/308

[56] References Cited
UNITED STATES PATENTS
3,418,867  12/1968  Maeda......................... 74/501 R X

*Primary Examiner*—Samuel Scott
*Assistant Examiner*—Frank H. McKenzie, Jr.
*Attorney, Agent, or Firm*—Olson, Trexler, Wolters, Bushnell & Fosse, Ltd.

[57] ABSTRACT

A control for operating a Bowden cable or the like is disclosed. The control comprises a pivoted lever for adjusting the Bowden cable control wire relative to the cable sheath, and a control housing. The housing includes a bi-sided cover portion and first and second base members, each base member dependently hinged from a cover side. When joined together in confronting relationship, the base members provide a pivot point for the lever, and also grasp a portion of the Bowden cable sheathing, securing the sheathing portion within the housing.

16 Claims, 9 Drawing Figures

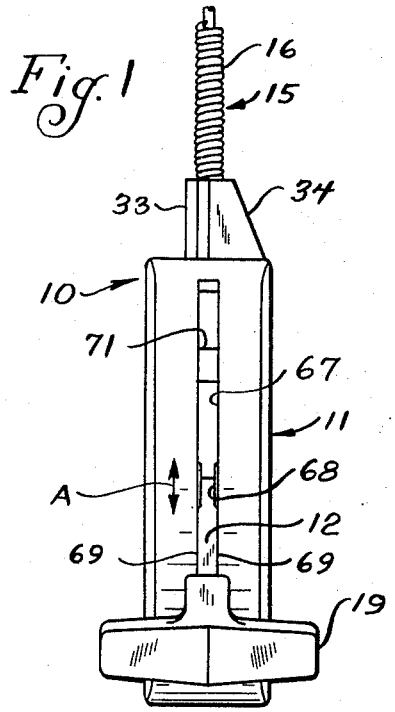
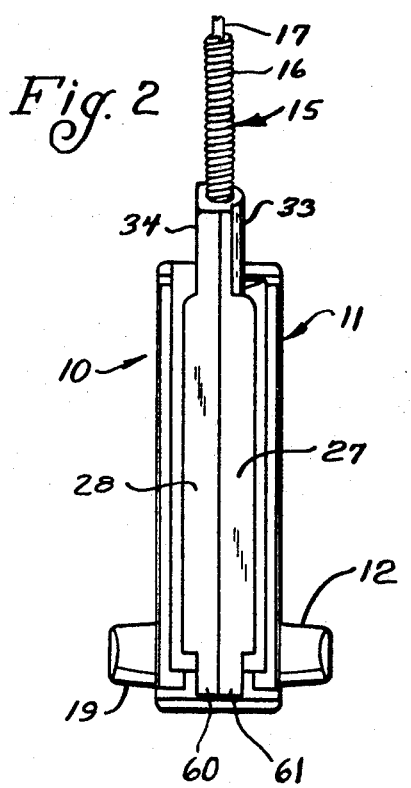
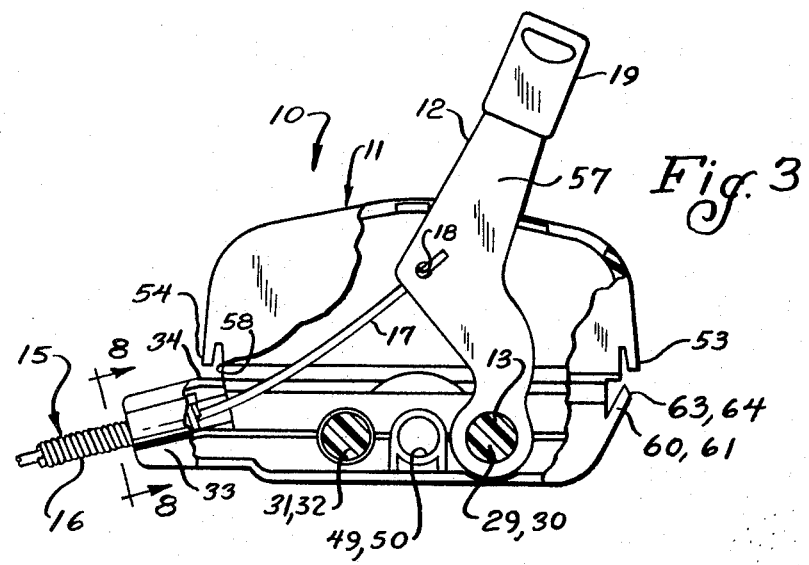
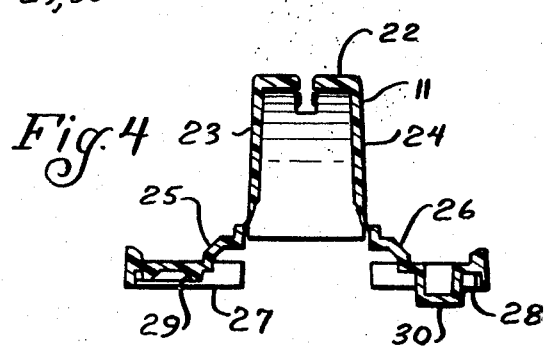

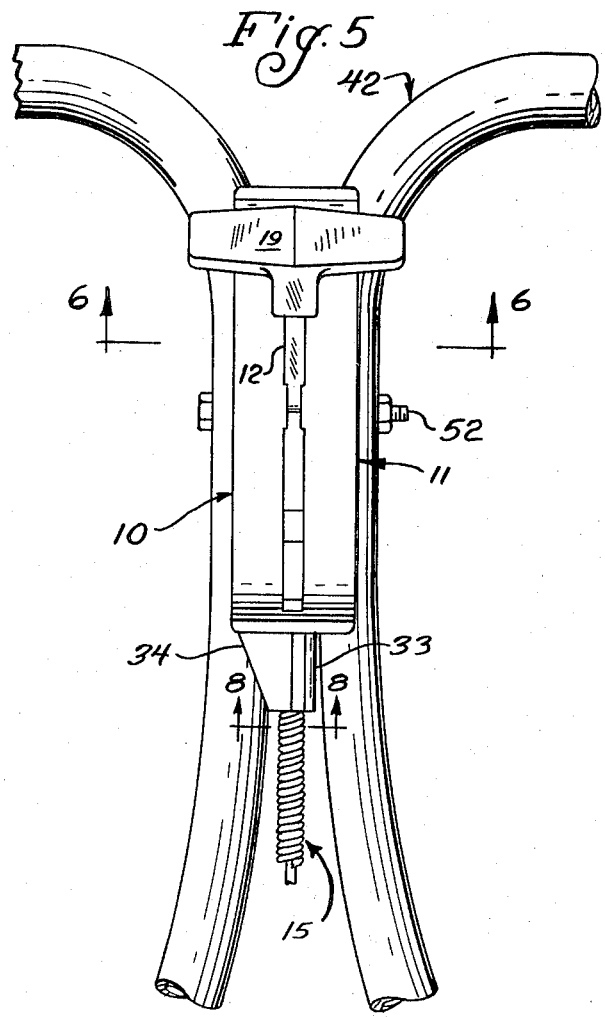
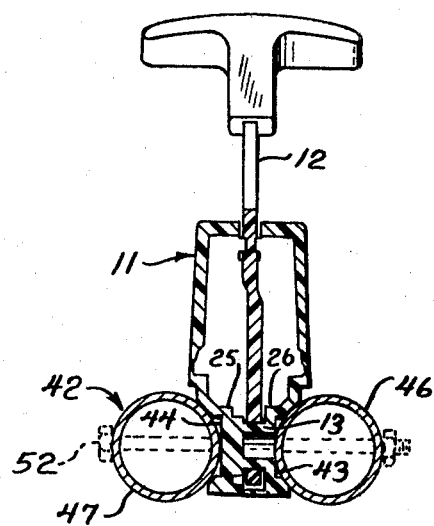
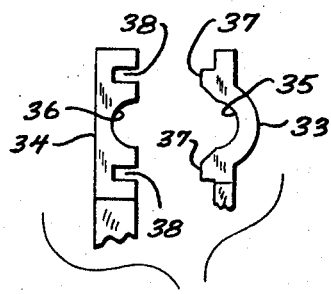
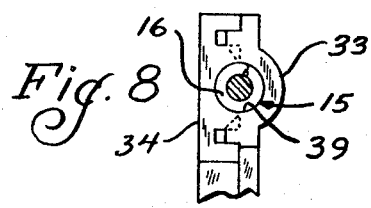
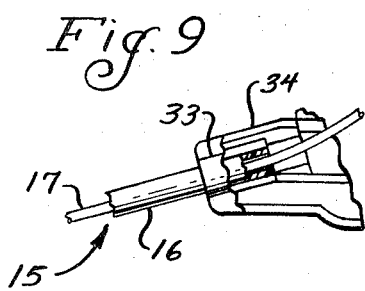

PUSH PULL CONTROL FOR LAWN MOWERS AND THE LIKE

BACKGROUND OF THE INVENTION

This invention relates generally to control devices and more particularly concerns a control for operating a Bowden cable used with a lawn mower or like device.

Modern power lawn mowers usually include a gasoline engine mounted on a wheeled chassis, a guiding handle pivotally connected to the chassis, and one or more regulating mechanism extending from the upper portions of the guiding handle to the engine and other parts. These regulating mechanisms often include a Bowden cable having an outer covering within which is slidably carried an inner control wire. The outer covering can comprise a flexible elongated wire coil, a plastic tube or other sheathing. One end of the inner control wire is connected to an engine speed regulator or other adjustable assembly, while the other end of the control wire is connected to an engine control device mounted on the guiding handle for easy manipulation by the operator. By adjusting this control device, the engine speed or power can be varied through a given range.

In designing such controls, several difficult design criteria must be considered. The expense of these controls must be kept to a minimum, but the controls must be rugged, virtually maintenance-free and durable. They must be straightforward in their operation, and their operation easily understood by even an inexperienced user. The controls must be capable of being securely mounted to the controlled device and must provide a solid, positive operating feel to the operator, yet they must be capable of easy operation and precise adjustment. The controls must withstand a wide range of temperatures, and must be minimally affected by dirt, and petroleum products or like materials. They must survive vibration and occasionally relatively severe impact shocks. Production economies can be realized if one control can be adapted for use with several disparate types of lawn mowers. Further economies can be obtained from minimizing the number of parts in the control and in minimizing the assembly effort involved in putting the control together.

It is the general object of the present invention to meet, to as great an extent as possible, the above general design criteria.

More specifically, it is an object of the present invention to provide a control mechanism for lawn mowers and like devices which includes a minimal number of parts. An associated object is to provide a control which can be manufactured at relatively low cost.

Another object is to provide a control device having a one-piece housing which will exclude dirt and foreign matter from the control mechanism.

It is another object of the invention to provide a control device which can be assembled at low cost, and which permits the use of relatively low-cost fabricating techniques such as ultrasonic welding during the assembly.

It is yet another object of the invention to provide a control device which can be used with any one of a variety of lawn mowers or like Bowden cable-controlled devices. An associated object is to provide a control device which can be mounted upon any one of a variety of mower handle bars or other mounting sites.

It is a further object of the invention to provide a control device which will permit the operator to manipulate a control member so as to obtain a pre-selected engine power setting, starting setting, or other significant setting by feel alone.

It is a still further object of the invention to provide a control device which will be resistant to ultraviolet radiation and other environmental factors. An associated object is to provide a control device which can be fabricated largely, if not entirely, from low-cost materials.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a top plan view of a typical control device embodying the present invention;

FIG. 2 is a bottom plan view of the control device illustrated in FIG. 1;

FIG. 3 is a side elevational view of the device shown in FIGS. 1 and 2, a portion of the side being broken away to show in further detail the inner structure of the device;

FIG. 4 is a sectional view of the control device similar to FIG. 6 but showing the control device housing as it appears before it is secured in its final configuration;

FIG. 5 is a top plan view showing the novel control device as it appears when assembled upon a lawn mower handle or like mounting site;

FIG. 6 is a sectional view taken substantially in the plane of line 6—6 in FIG. 5 and showing in further detail the novel control device as it appears when mounted upon a lawn mower handle;

FIG. 7 is a fragmentary elevational view of the housing base members as they appear before assembly in their final configuration;

FIG. 8 is a fragmentary elevational view similar to FIG. 7 but showing the base members as they appear when assembled in their final configuration; and FIG. 9 is a fragmentary elevational view showing the base members and the secured Bowden cable, portions of one base member being broken away to show in further detail the arrangement of the Bowden cable and the base members.

DESCRIPTION OF THE PREFERRED EMBODIMENT

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning first to FIGS. 1-3, there is shown an embodiment of the novel lever control device having but four parts. The illustrated control device 10 includes a housing 11, and a control lever 12 mounted upon a pivot 13 therein. A Bowden cable 15 comprises an outer sheathing 16 secured to the housing 11 (see FIG. 9) and a control wire 17 mounted within the sheathing 16 and operatively connected to the control lever 12, as by insertion through and connection to a hole 18 formed within the lever 12. Pivotal motion of the lever 12 relative to the housing 11 as indicated by the arrow A in FIG. 1 causes corresponding motion of the control wire 17 relative to the sheathing 16. The control lever 12 may be provided, if desired, with an attractive and easily grasped head 19.

It is a feature of the invention that the housing 11 excludes dirt and foreign matter from the mechanism, and secures the above-described parts in their operative positions, yet is a unitary member, capable of being cast in a single piece. To this end, the housing 11 includes, as may be seen in FIG. 4, a cover member 22 having two sides 23 and 24. Dependently hinged from each of these cover member sides 23 and 24 are base members 25 and 26, respectively. As shown in FIGS. 6, 8 and elsewhere, each base member 25 or 26 is provided with a side 27 or 28, respectively, formed to mate in confronting relationship with the side 28 or 27 of the opposite base member 26 or 25. Moreover, mounted upon or formed within each base member 25 or 26 is an embossment 29 or 30, respectively, formed to mate with an embossment 30 or 29 carried upon the other base member 26 or 25. Thus, when the base members 25 and 26 are folded from the positions shown in FIG. 4 to those shown in FIG. 6 during assembly, the sides 27 and 28 abut and the embossments 29 and 30 mate. The abutting sides and mating embossments can be enjoined permanently together, thus providing an enclosed, unitary housing 11. It is a feature of the invention that these base members can be permanently and economically interjoined by ultrasonically produced weldments; other known means of joining can be used as desired. Additional embossments 31 and 32 can be included to increase the strength and rigidity of the housing 11.

In carrying out the invention, the cylindrical pin embossment 30 forms the lever pivot 13, thereby reducing costs. The mating embossment 29 is formed as a depressed seat to accommodate the head of the pin 30. When the base members 25 and 26 are folded together, and the lever 12 assembled over the stud 30, ultrasonic welding techniques can be used to fuse the head of the pin embossment 30 to the adjacent portions of the seat 29 and form the pivot 13 carrying the lever 12, as illustrated in FIGS. 3 and 6.

In accordance with another aspect of the invention, the base members 25 and 26 are formed to grasp a portion of the outer sheathing 16 of the Bowden cable 15, and secure it within the control, as illustrated in FIGS. 7–9 and elsewhere. To this end, each base member 25 and 26 is provided with a nose portion 33 and 34, respectively, wherein is provided a channel portion 35 and 36 formed to accommodate and graspingly retain the outer sheath 16 of the Bowden cable 15. Moreover, the nosepieces 33 and 34 are provided with lands 37 and recesses 38 which mate and, upon the applications of ultrasonic welding techniques, fuse as illustrated in FIG. 8. An enclosed channel 39 is thus formed which grasps the outer sheathing 16 of the Bowden cable 15 as illustrated.

In accordance with a further aspect of the invention, the control device 10 can be easily attached to the handle 42 of a lawn mower or other device. As illustrated in FIGS. 5, 6, and elsewhere, the base members 25 and 26 include channelled outer sides 43 and 44 which are designed to accommodate and fit snugly between the double tubes 46 and 47 comprising the lawn mower handle 42. Alternatively, the control 10 can be mounted on an outerside of either tube 46 or 47, if good design so requires. Alignable apertures 49 and 50 formed in the base members 25 and 26 permit the control to be secured to the handle 42 by an interconnecting fastener such as a bolt 52.

Alternative means are provided for attaching the controlled end to other lawn mower handles or other devices. As illustrated in FIG. 3, projections 53 and 54 are formed in the ends of the housing member 11, and these projections 53 and 54, together with lower tabs 63 and 64 formed in base members 26 and 25, can be used to hook or snap the control 10 to a convenient mounting site. If the control installer desires to mount the control 10 in an aperture formed in a panel (not shown), the Bowden cable 16 and nosepieces 33 and 34 can be inserted through the panel hole until a housing surface 58 located interiorly of the projection 54 is abutted by the aperture edge. The housing 11 can then be urged downwardly to cause two lower tabs 60 and 61 to deflect until their tips 63 and 64 respectively clear the panel aperture. The resilient tabs 60 and 61 then spring back toward their original place, locking the control 10 in the aperture hole between the lower tabs 60 and 61 and the projection 53.

Means are porvided to permit the control lever 12 to be set, relative to the housing 11, at a pre-selected significant location by feel alone in accordance with yet another aspect of the invention. That is, the lawn mower operator can, by feel alone, position the control lever 12 for engine starting, or for maximum power, or at another significant location. To this end, the cover member 11 is provided with a slot 67 along which the lever 12 moves. Formed upon the edges of the slot are small embossments 68 which extend into the slot area to engage the sides 69 of the lever 12, thereby partially and temporarily restricting the movement of the lever when a significant lever setting is obtained, and permitting the operator to locate the lever, by feel alone, at the desired setting.

Pursuant to the invention, the control 10 may by used with a variety of disparate lawn mowers, each lawn mower requiring a correspondingly disparate amount of motion of the control wire 17 relative to the outer sheathing 16 to provide the full range of mower power settings or other operating characteristics. To this end, a stop bar 71 extends across the slot 67 for limiting the travel of the lever 12 to less than the full length of the slot 67. When the control 10 is used with lawn mowers or other control devices requiring relatively limited motion of lever 12, the stop bar 71 is left in place across the slot 67, thereby limiting the motion of the lever 12 to the correct amount. Conversely, when the control 10 is used with the mowers requiring a greater movement of the control lever 12, the stop bar 71 can be removed easily and quickly by a blow during control assembly.

It is a feature of the invention that the control is resistant to dirt, petroleum or other chemicals, sunlight caused deterioration, and other environmental hazards. To this end, the cover member 11 and lever 12 are formed of an inexpensive injection molded thermoplastic, such as polypropylene plastic. Resistance to the deteriorational effects of ultraviolet radiation can be enhanced by including a black ultraviolet reflective pigment within the raw plastic material used to form the described parts.

The invention is claimed as follows:

1. In a control for operating a Bowden cable or the like, a one-piece housing including a two-sided cover member and two integrally formed base members, each base member dependently hinged from the cover member and having at least one embossment formed to mate with an embossment on the other base member for joining the base members together in confronting relationship.

2. A control for operating a Bowden cable or the like, comprising a housing and a lever, the housing including a two-sided cover member, and first and second base members formed integrally with the cover member, one base member depending from each side of the cover member and having at least one embossment formed to mate with an embossment on the other base member to permit the base members to be joined together in confronting relationship and to secure a portion of the lever at a pivot point within the housing.

3. A control for operating a Bowden cable or the like, comprising a housing and a lever, the housing including a two-sided cover member and first and second base members, each base member dependently hinged from a side of the cover member and having at least one embossment formed to mate with an embossment on the other base member, the embossments, when joined together, securing a portion of the lever at a pivot point within the housing.

4. A control according to claim 3 including weldment means joining together said base members.

5. A control according to claim 3 wherein one embossment includes a pin member adapted to engage a pivot hole formed in said lever, and said mating embossment includes a seat member adapted to engage the head of the pin member.

6. A control according to claim 3 wherein the Bowden cable includes an outer sheath and an inner control wire member slidable within the sheath and wherein the control wire is operatively secured to the lever and the sheath is secured to at least one of the base members, whereby pivotal movement of the lever relative to the housing causes corresponding movement of the control wire relative to the sheath.

7. A control according to claim 6 wherein the base members are provided with portions to grasp the sheath between the base members and secure a portion of the sheath within the housing.

8. A control according to claim 3 wherein at least one base member is provided with a channelled side to permit the control to be attached to a double-tube lawn mower handle or the like.

9. A control according to claim 3 wherein the base members are provided with alignable apertures to permit the control to be secured to a lawn mower handle or the like by an interconnecting fastener.

10. A control according to claim 3 wherein the housing is provided with resilient hook portions for attaching the control to a mounting site.

11. A control according to claim 3 wherein the housing is provided with a slot through which the lever extends and a stop bar extending across the slot for limiting the travel of the lever to less than the full length of the slot.

12. A control according to claim 3 wherein the housing is provided with a slot through which the lever extends, the housing including land embossment means extending into the slot area for impeding the movement of the lever at a significant lever location.

13. A control according to claim 3 wherein said cover member and said base members are integrally formed of a thermoplastic.

14. A control according to claim 13 wherein said cover members and said base members comprise a single piece of thermoplastic material.

15. A control according to claim 13 including a pigment contained within said plastic for reducing the deteriorational effects of ultraviolet radiation on said control.

16. In a control for operating a Bowden cable or the like, a one-piece housing including a two-sided cover member and two integrally formed base members, each base member dependently hinged from the cover member and having at least one embossment formed to mate with an embossment on the other base member for securing a portion of the lever at a pivot point within the housing.

* * * * *